(12) United States Patent
Zhou (10) Patent No.: US 11,992,377 B2
(45) Date of Patent: May 28, 2024

(54) LIGHT-EMITTING DENTAL FLOSS

(71) Applicant: Guangzhou T.K Medical Instrument Co., Ltd., Guangzhou (CN)

(72) Inventor: Xing Zhou, Guangzhou (CN)

( * ) Notice: Subject to any disclaimer, the term of this patent is extended or adjusted under 35 U.S.C. 154(b) by 463 days.

(21) Appl. No.: 17/331,486

(22) Filed: May 26, 2021

(65) Prior Publication Data

US 2021/0282909 A1     Sep. 16, 2021

Related U.S. Application Data

(63) Continuation of application No. PCT/CN2019/088420, filed on May 24, 2019.

(30) Foreign Application Priority Data

Nov. 28, 2018 (CN) .......................... 201811439037.9

(51) Int. Cl.
*A61C 15/04* (2006.01)
(52) U.S. Cl.
CPC ........ *A61C 15/046* (2013.01); *A61C 2204/00* (2013.01)
(58) Field of Classification Search
CPC ......... A61C 15/00; A61C 15/02; A61C 15/04; A61C 15/041; A61C 15/042;
(Continued)

(56) References Cited

U.S. PATENT DOCUMENTS 5,279,314 A * 1/1994 Poulos ................. A61C 15/047
132/325
5,343,883 A * 9/1994 Murayama ............. A61C 17/20
433/118
(Continued)

FOREIGN PATENT DOCUMENTS

CA    2418360 A1    8/2003
CN   104905547 B    8/2017
(Continued)

OTHER PUBLICATIONS

Zhou, Zing, International Search Report, PCT/CN2019/088420, dated Aug. 21, 2019, 4 pgs.
Zhou, Xing, International Preliminary Report on Patentability and Written Opinion, PCT/CN2019/088420, dated Aug. 21, 2019, 9 pgs.
Zhou, Xing, Communication pursuant to Rules 161(2) and 162 EPC, EP19890757.8, dated Jul. 6, 2021, 3 pgs.
Zhou, Xing, European Search Report, EP19890757.8, dated Jul. 14, 2022, 9 pgs.
Zhou, Xing, Communication pursuant to Rules 70(2) and 70a(2) EPC, EP19890757.8, dated Aug. 2, 2022, 1 pg.
(Continued)

*Primary Examiner* — Cris L. Rodriguez
*Assistant Examiner* — Karim Asqiriba
(74) *Attorney, Agent, or Firm* — Morgan, Lewis & Bockius LLP (57) ABSTRACT

Luminous dental floss of the present application includes dental floss, an illumination system, and a handle. The dental floss is detachably connected to the handle. The illumination system includes a light source system, a circuit system, a switch, and a power supply system. The light source system is connected to the power supply system through the circuit system. The circuit system and the power supply system are mounted in the handle, and the switch is mounted on the handle. Illumination light emitted by the light source system can illuminate an oral cavity, and especially an observation window is designed on the luminous dental floss of the present application. During use, under the illumination of the illumination system, a process of the dental floss entering a gap between teeth can be directly observed, thereby facilitating cleaning and effectively avoiding accidental injury to gingivae.

11 Claims, 5 Drawing Sheets

(58) Field of Classification Search
CPC ... A61C 15/043; A61C 15/045; A61C 15/046; A61C 15/047; A61C 15/048; A61C 2204/00; A61C 2204/002; A61C 2204/005; A46B 15/0036; A46B 15/0069; A46B 15/0071; A46B 15/0075; A46B 15/0097; A46B 2200/108
See application file for complete search history.

(56) References Cited

U.S. PATENT DOCUMENTS

| | | | |
|---|---|---|---|
| 6,685,471 | B1 | 2/2004 | Kawamura et al. |
| 7,140,373 | B2* | 11/2006 | Rehkemper .......... A61C 15/047 132/322 |
| 8,763,615 | B1* | 7/2014 | Dominguez ......... A61C 15/047 132/322 |
| 10,709,531 | B1* | 7/2020 | Urso ...................... A61C 15/04 |
| 2003/0196677 | A1 | 10/2003 | Wiseman |
| 2004/0079384 | A1 | 4/2004 | Lai et al. |
| 2008/0006289 | A1* | 1/2008 | Filsouf ................. A61C 15/046 132/325 |
| 2008/0041412 | A1 | 2/2008 | Jansheski et al. |
| 2008/0257378 | A1 | 10/2008 | Jansheski |
| 2010/0116287 | A1* | 5/2010 | Cohen .................. A61C 15/042 132/323 |
| 2010/0139689 | A1* | 6/2010 | Couch .................. A61C 15/047 132/325 |
| 2013/0239986 | A1* | 9/2013 | Pruett .................. A61C 15/047 132/309 |
| 2015/0157119 | A1* | 6/2015 | Barnes ............... A46B 15/0008 134/6 |
| 2016/0324595 | A1* | 11/2016 | Benning ............ A61C 17/0202 |
| 2019/0105139 | A1* | 4/2019 | Zhou .................... A61C 17/224 |

FOREIGN PATENT DOCUMENTS

| | | |
|---|---|---|
| CN | 108309489 A | 7/2018 |
| JP | H05253251 A | 10/1993 |
| JP | 2001357702 A | 12/2001 |
| JP | 2009022697 A | 2/2009 |
| JP | 2012161368 A | 8/2012 |
| JP | 2012249719 A | 12/2012 |
| JP | 2017512608 A | 5/2017 |
| JP | 2018527158 A | 9/2018 |

OTHER PUBLICATIONS

Singh, Notice of Reasons for Refusal, JP2021530046, dated Jan. 27, 2023, 12 pgs.
Singh, Written Opinion, JP2021530046, dated May 30, 2023, 8 pgs.

* cited by examiner

LIGHT-EMITTING DENTAL FLOSS

CROSS-REFERENCE TO RELATED APPLICATIONS

This application is a continuation application of PCT Patent Application No. PCT/CN2019/088420, entitled "LIGHT-EMITTING DENTAL FLOSS" filed on May 24, 2019, which claims priority to Chinese Patent Application No. 201811439037.9, filed with the State Intellectual Property Office of the People's Republic of China on Nov. 28, 2018, and entitled "LIGHT-EMITTING DENTAL FLOSS", both of which are incorporated herein by reference in their entirety.

TECHNICAL FIELD

The present application relates to a tool for oral cavity cleaning, and in particular, to dental floss for cleaning a gap between teeth.

BACKGROUND

Due to reasons such as aging, pathology, and the like, gingival atrophy is easily caused, and a gap between teeth is easily expanded, thereby causing food residues. If the residues are not cleaned in time, not only oral odor may be generated, but also various dental diseases, oral diseases, and especially periodontitis are easily caused.

Dental floss is an important interdental cleaning tool on the market. Although there are various products with different structures and specifications on the market, the existing products are generally difficult to observe the gap between teeth. Especially, when a gap between a third molar and a second molar, or a gap between the second molar and a first molar, or a gap between the first molar and the second molar is cleaned, because a position of the gap between the teeth to be cleaned is located deep in an oral cavity, light in a cleaned part is very dark. When there is no external lighting, a user can only operate by feeling, which will easily cause bleeding or damage to gums. Therefore, the existing dental floss needs to be improved.

SUMMARY

Luminous dental floss of the present application is illuminated by a light source system to ensure that a cleaned part may be clearly observed in a cleaning process, thereby effectively preventing accidental damage to gums while ensuring the cleaning effect.

The luminous dental floss of the present application, where the luminous dental floss 100 includes dental floss 1, an illumination system 2, and a handle 3,
  A. the dental floss 1 includes a connecting portion 12 and a working portion 13;
  B. the illumination system 2 includes a light source system 21, a circuit system 22, a switch 23, and a power supply system 24, the light source system 21 being connected to the power supply system 24 through the circuit system 22;
  C. the handle 3 is provided with a connecting end 31 connected to the dental floss 1; and
  D. the dental floss 1 is detachably connected to the handle 3, the circuit system 22 and the power supply system 24 are mounted in the handle 3, and the switch 23 is mounted on the handle 3.

The illumination system 2 is designed on the handle 3 of the luminous dental floss of the present application, and the illumination light emitted by the light source system 21 of the illumination system 2 can illuminate the oral cavity. The dental floss is used to clean a gap between teeth with enough light, thereby effectively preventing the dental floss from accidentally damaging gums during cleaning while ensuring the cleaning effect. Through the detachable connection mode, the dental floss 1 can be replaced in time after use, so that the use process is cleaner and more hygienic.

The dental floss 1 is further provided with an observation window 11.

The observation window 11 is provided between the working portion 13 and the connecting portion 12. The observation window 11 provided between the working portion 13 and the connecting portion 12 may better observe the clean part, and the observation window 11 is usually designed as a triangle.

The dental floss 1 is made of a light guide material. The dental floss 1 may be made of a light guide material to transmit the illumination light emitted by the light source system 21 to inside of the oral cavity to achieve illumination.

A light guide channel 14 is disposed on the dental floss 1. The light guide channel 14 may also be designed on the dental floss 1 to achieve transmission of the illumination light. The applicant herein only specifies the foregoing two ways of transmitting the illumination light. In actual application, those skilled in the art may design other ways of transmitting various light as required without departing from the protection scope of this application.

The dental floss 1 and the handle 3 are connected in a rotating manner, a concave-convex snap fit manner, or an interference fit manner. The applicant herein only lists the foregoing three connection manners. Those skilled in the art may design various connection manners as required without departing from the protection scope of this application.

The dental floss 1 and the handle 3 are connected in a concave-convex snap fit manner; the connecting portion 12 includes a positioning convex step 12-1, and the connecting end 31 includes a positioning groove 31-1, the positioning convex step 12-1 being embedded in the positioning groove 31-1 during connection.

The connecting end 31 further includes a fixing sleeve 31-2, the fixing sleeve 31-2 being pushed upward during connection and being capable of being fixed outside the positioning convex step 12-1 and the positioning groove 31-1. The fixing sleeve 31-2 is sleeved outside the positioning convex step 12-1 and the positioning groove 31-1, which can further ensure firmness of the connection between the dental floss 1 and the handle 3.

The power supply system 21 is mounted in the handle 3, and a front end of the handle 3 is made of a light guide material. The front end of the handle 3 is made of the light guide material, so that illumination light of the light source system 21 can be transmitted from the handle 3, thereby achieving illumination of the cleaning process. The light source system 21 is designed in the handle 3, which can effectively isolate potential safety hazards caused by an electronic component entering the oral cavity, so that the use process is safer.

The power supply system 24 is a battery 24-1, the battery 24-1 being mounted in the handle 3. The power supply system 24 uses the battery 24-1 as a power supply, which is convenient for carrying and usage. In addition, because the battery 24-1 may be sealed in the handle 3, there will be no potential safety hazard of accidental electric shock during use, so that the use process is safer.

The illumination system 2 has a timing function, and the light source system 21 is automatically turned off within a specified time after the switch 23 is turned on. The timing function of the illumination system 2 can automatically turn off the illumination system 2 after a certain period of time when the user forgets to turn off the illumination system 2, thereby ensuring the battery life of the battery 24-1 and prolonging the service life of the product. Moreover, even if the illumination system 2 is turned on by mistake during carrying, the illumination system can be automatically turned off after a certain period of time, so that the use process is safer.

The handle 3 is provided with an end cover 33, the battery 24-1 disposed in the handle 3 being replaced after the end cover 33 is removed. The detachable design of the end cover 33 can facilitate the replacement of the battery 24-1.

The luminous dental floss 100 is capable of being placed on a tabletop in an upright manner. The luminous dental floss 100 is capable of being placed on a tabletop in an upright manner, and especially in public places, this upright placing method can effectively ensure that the dental floss 1 is not contaminated, so that the use process is cleaner and hygienic.

A luminous dental floss of the present application includes dental floss 1, an illumination system 2, and a handle 3. The dental floss 1 is detachably connected to the handle 3; and the illumination system 2 includes a light source system 21, a circuit system 22, a switch 23, and a power supply system 24, the light source system 21 is connected to the power supply system 24 through the circuit system 22; the circuit system 22 and the power supply system 24 are mounted in the handle 3, and the switch 23 is mounted on the handle 3. The illumination light emitted by the light source system 21 may illuminate the oral cavity, so that the cleaned part may be clearly observed in the cleaning process, thereby effectively preventing accidental damage to gums while ensuring the cleaning effect.

In the foregoing figure:
100 represents luminous dental floss of the present application.
1 represents dental floss, 2 represents an illumination system, 3 represents a handle.
11 represents an observation window; 12 represents a connecting portion of dental floss, 12-1 represents a positioning convex step, 12-2 represents a connecting screw; 13 represents a working portion of dental floss, 131 represents round dental floss, 132 represents flat dental floss; 14 represents a light guide channel.
21 represents a light source system, 22 represents a circuit system, 23 represents a switch, 24 represents a power supply system; 24-1 represents a battery.
31 represents a connecting end, 32 represents a body of a handle, 33 represents an end cover, 34 represents a sealing ring; 31-1 represents a positioning groove, 31-2 represents a fixing sleeve, and 31-3 represents a connecting nut.

DESCRIPTION OF EMBODIMENTS

Embodiment 1: Luminous Dental Floss Connected in a Concave-Convex Snap Fit Manner of the Present Application Referring to FIG. 1 to FIG. 6, luminous dental floss of the present embodiment includes dental floss 1, an illumination system 2, and a handle 3.

In the present embodiment, the dental floss 1 includes an observation window 11, a connecting portion 12, and a working portion 13. The observation window 11 is provided between the working portion 13 and the connecting portion 12, so that a cleaned part can be clearly observed. The observation window 11 is generally triangular in shape, and has a good observation field while maintaining strength.

In the present embodiment, the working portion 13 of the dental floss 1 is round dental floss 131 with good cleaning effects.

The dental floss 1 is made of a light guide material. The dental floss 1 may be made of the light guide material to transmit the illumination light emitted by the illumination system 2 to inside of the oral cavity to achieve illumination.

The illumination system 2 includes a light source system 21, a circuit system 22, a switch 23, and a power supply system 24. The light source system 21 is connected to the power supply system 24 through the circuit system 22.

The handle 3 is provided with a connecting end 31 connected to the dental floss 1.

In the present embodiment, the dental floss 1 is detachably connected to the handle 3 in a concave-convex snap fit manner. The connecting portion 12 includes a positioning convex step 12-1, and the connecting end 31 includes a positioning groove 31-1. The positioning convex step 12-1 is embedded in the positioning groove 31-1 during connection.

The connecting end 31 further includes a fixing sleeve 31-2, the fixing sleeve 31-2 being pushed upward during connection and being capable of being wrapped outside the positioning convex step 12-1 and the positioning groove 31-1. The fixing sleeve 31-2 is wrapped outside the positioning convex step 12-1 and the positioning groove 31-1, which can further ensure firmness of the connection between the dental floss 1 and the handle 3.

In the present embodiment, the light source system 21, the circuit system 22, and the power supply system 24 are mounted in the handle 3, and the switch 23 is mounted on the handle 3.

The front end of the handle 3 is made of the light guide material, so that illumination light of the light source system 21 can be transmitted from the handle 3, thereby achieving illumination of the cleaning process.

The light source system 21 is designed in the handle 3, which can effectively avoid potential safety hazards caused by an electronic component entering the oral cavity, so that the use process is safer.

In the present embodiment, the power supply system 24 is a battery 24-1, the battery 24-1 being mounted in the handle 3, and the battery 24-1 can be replaced by removing the end cap 33 of the handle 3. In the present embodiment, the end cover 33 is connected to the body 32 of the handle 3 through screw connection. To prevent short circuit caused by liquid entering the handle 3 during use and cleaning, the end cover 33 and the body 32 are sealed by using a sealing ring 34. The end cover 33 may further be sealed with the body 32 in other manners such as concave-convex snap fit, interference fit, and the like. The applicant will not list the manners one by one by using an example herein, which do not depart from the protection scope of this application.

The power supply system 24 uses the battery 24-1 as a power supply, which is convenient for carrying and usage. In addition, because the battery 24-1 may be sealed in the handle 3, there will be no potential safety hazard of accidental electric shock during use, so that the use process is safer.

The illumination system 2 has a timing function, and the light source system 21 is automatically turned off within a specified time after the switch 23 is turned on. The timing function of the illumination system 2 can automatically turn off the illumination system after a certain period of time when the user forgets to turn off the illumination system 2, thereby ensuring the battery life of the battery 24-1 and prolonging the service life of the product. Moreover, even if the illumination system 2 is turned on by mistake during carrying, the illumination system can be automatically turned off after a certain period of time, so that the use process is safer.

The luminous dental floss 100 is capable of being placed on a tabletop in an upright manner, and especially in public places, this upright placing method can effectively prevent the dental floss 1 from being contaminated, so that the use process is cleaner and hygienic.

During use, the positioning step 12-1 of the dental floss 1 is embedded in the positioning groove 31-1 of the handle 3, and then the fixing sleeve 31-2 is pushed upward. The fixing sleeve 31-2 is sleeved outside the positioning convex step 12-1 and the positioning groove 31-1, that is, the connection between the dental floss 1 and the handle 3 is completed. When the switch 23 is pressed, the light source system 21 emits illumination light to illuminate the oral cavity, and the dental floss 1 can be used to clean the gap between teeth.

The luminous dental floss of the present embodiment illuminates the oral cavity through the illumination light emitted by the light source system 21 and the observation window 11, so that the cleaned part may be clearly observed in the cleaning process, thereby effectively preventing accidental damage to gums while ensuring the cleaning effect.

Figure 1:
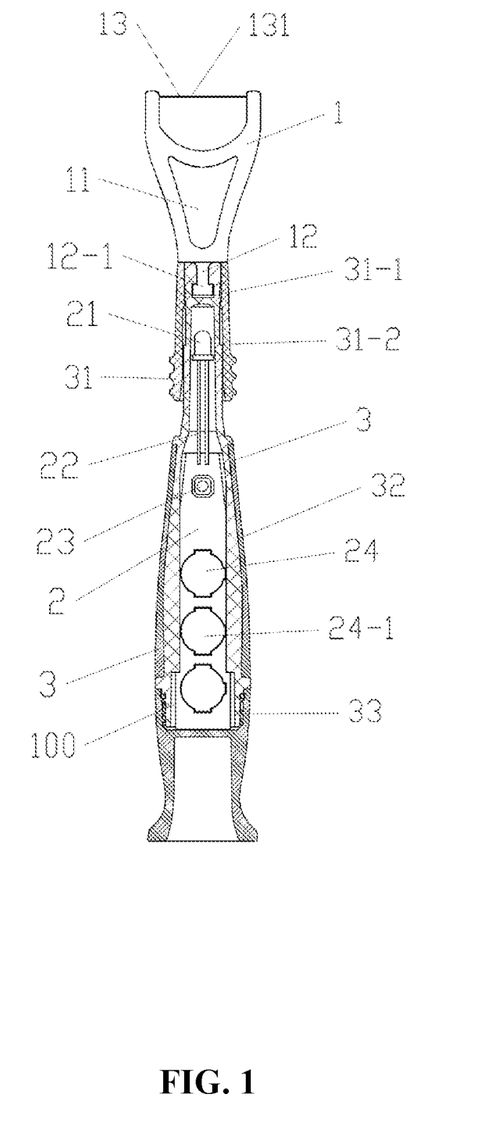
FIG. 1 is a schematic structural diagram of luminous dental floss according to the present application. In the present embodiment, the dental floss 1 is first embedded at a front end of a handle 3, then a fixing sleeve 31-2 is pushed forward, and the dental floss 1 is fixed at the front end of the handle 3 by positioning the fixing sleeve 31-2 forward.
Figure 2:
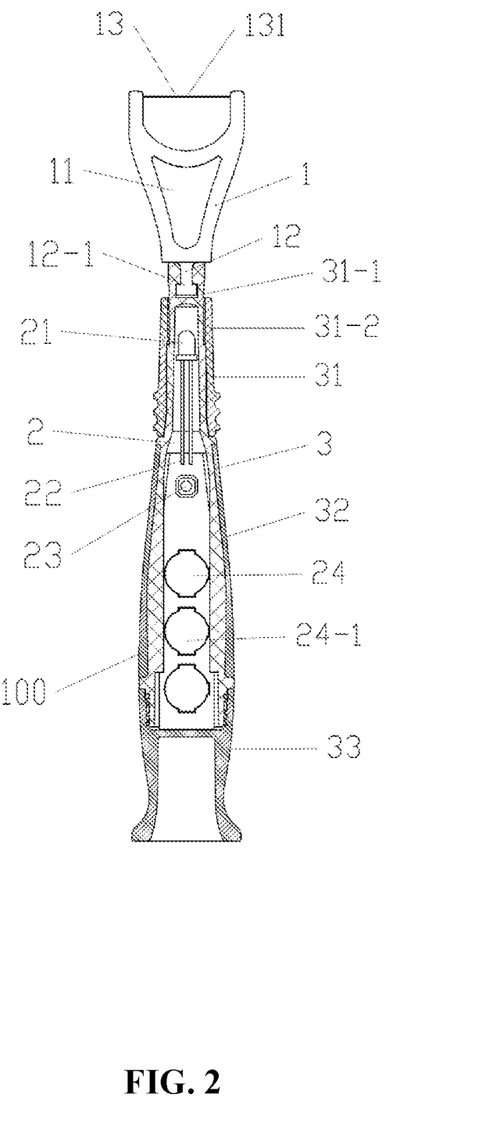
FIG. 2 is a schematic structural diagram of luminous dental floss during detachment of dental floss according to the present application. In the present embodiment, the fixing sleeve 31-2 is pushed backward so that the fixing sleeve 31-2 is positioned backward, and a concave-convex snap-fit connection mechanism between the dental floss 1 and the front end of the handle 3 is exposed and unlocked, so that the dental floss 1 can be separated from the front end of the handle 3.
Figure 3:
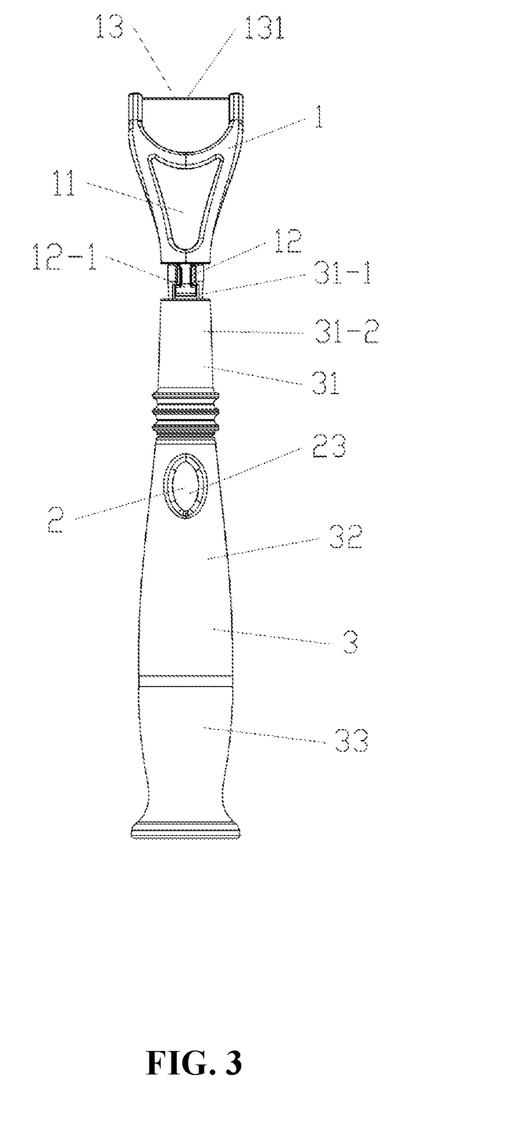
FIG. 3 is a schematic structural diagram of luminous dental floss in an unlocked state according to the present application. In the present embodiment, the fixing sleeve 31-2 is positioned backward, and a concave-convex snap-fit connection mechanism between the dental floss 1 and the front end of the handle 3 is in an unlocked state, so that the dental floss 1 and the front end of the handle 3 can be assembled and disassembled.
Figure 4:
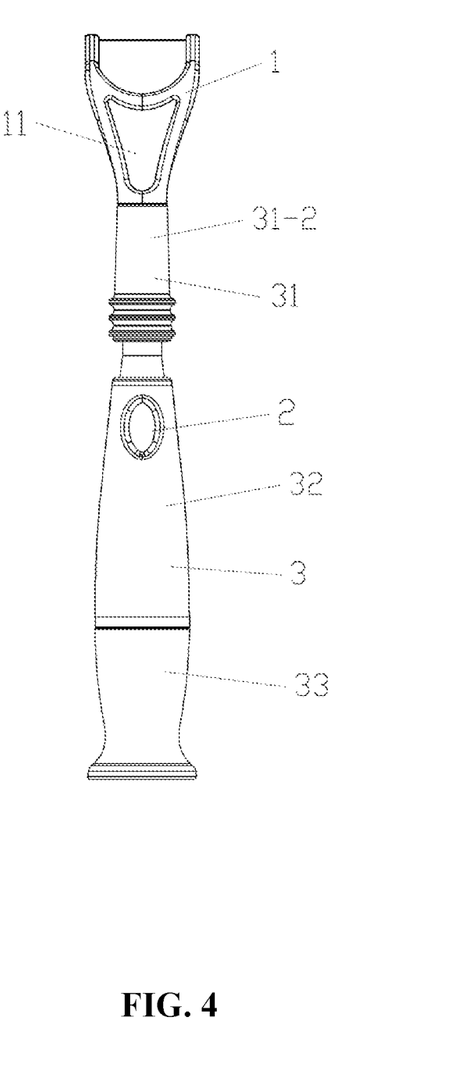
FIG. 4 is a schematic structural diagram of luminous dental floss in a locked state according to the present application. In the present embodiment, the fixing sleeve 31-2 is positioned forward, and a concave-convex snap-fit connection mechanism between the dental floss 1 and the front end of the handle 3 is in a locked state, so that the dental floss 1 and the front end of the handle 3 cannot be assembled and disassembled due to being fixed together.
Figure 5:
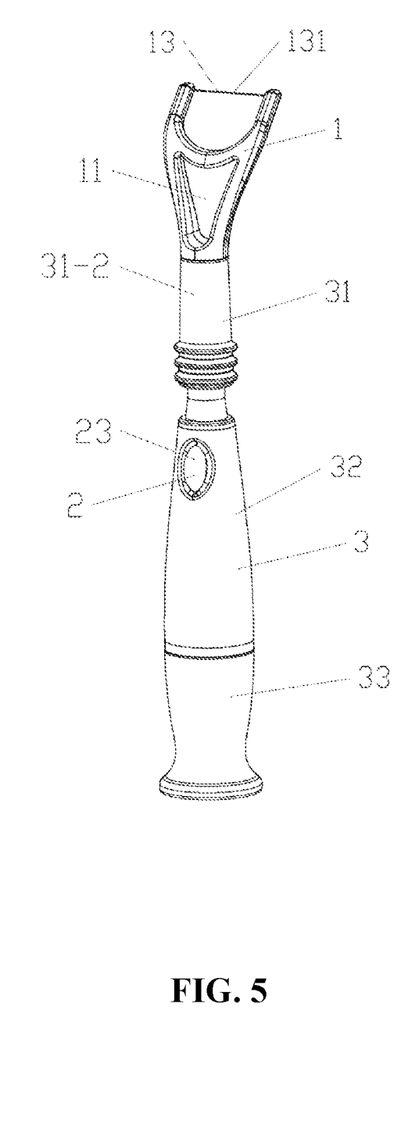
FIG. 5 is a three-dimensional schematic structural diagram of luminous dental floss according to the present application.
Figure 6:
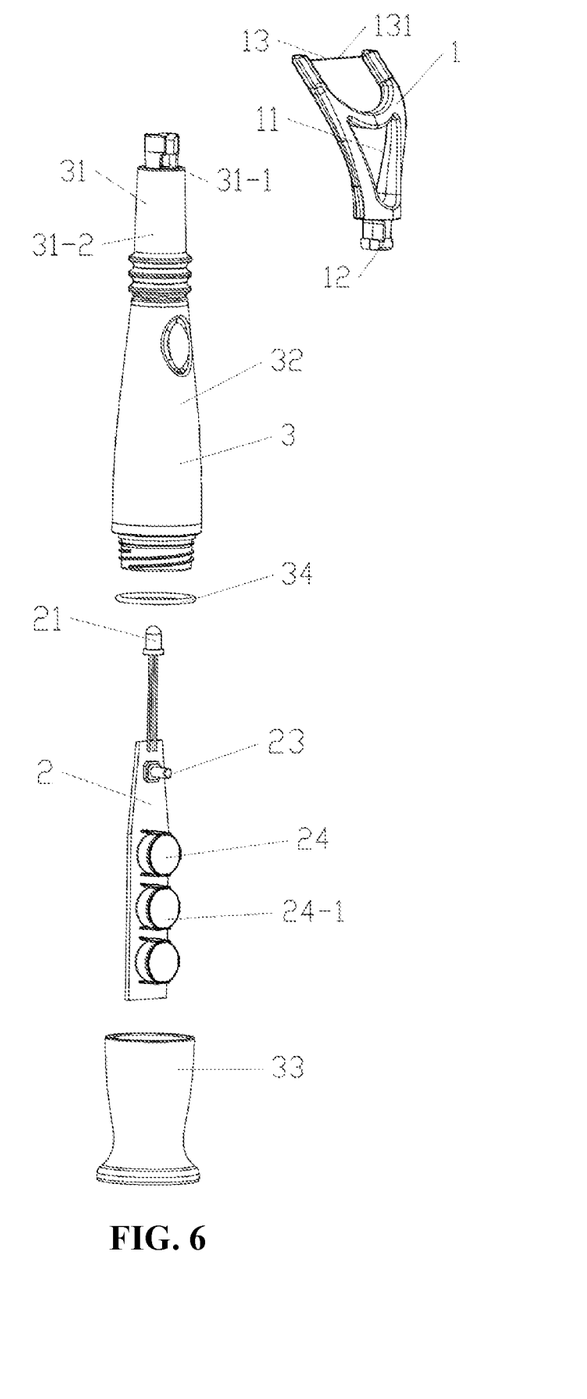
FIG. 6 is an exploded view of FIG. 5.
Figures 7, 8:
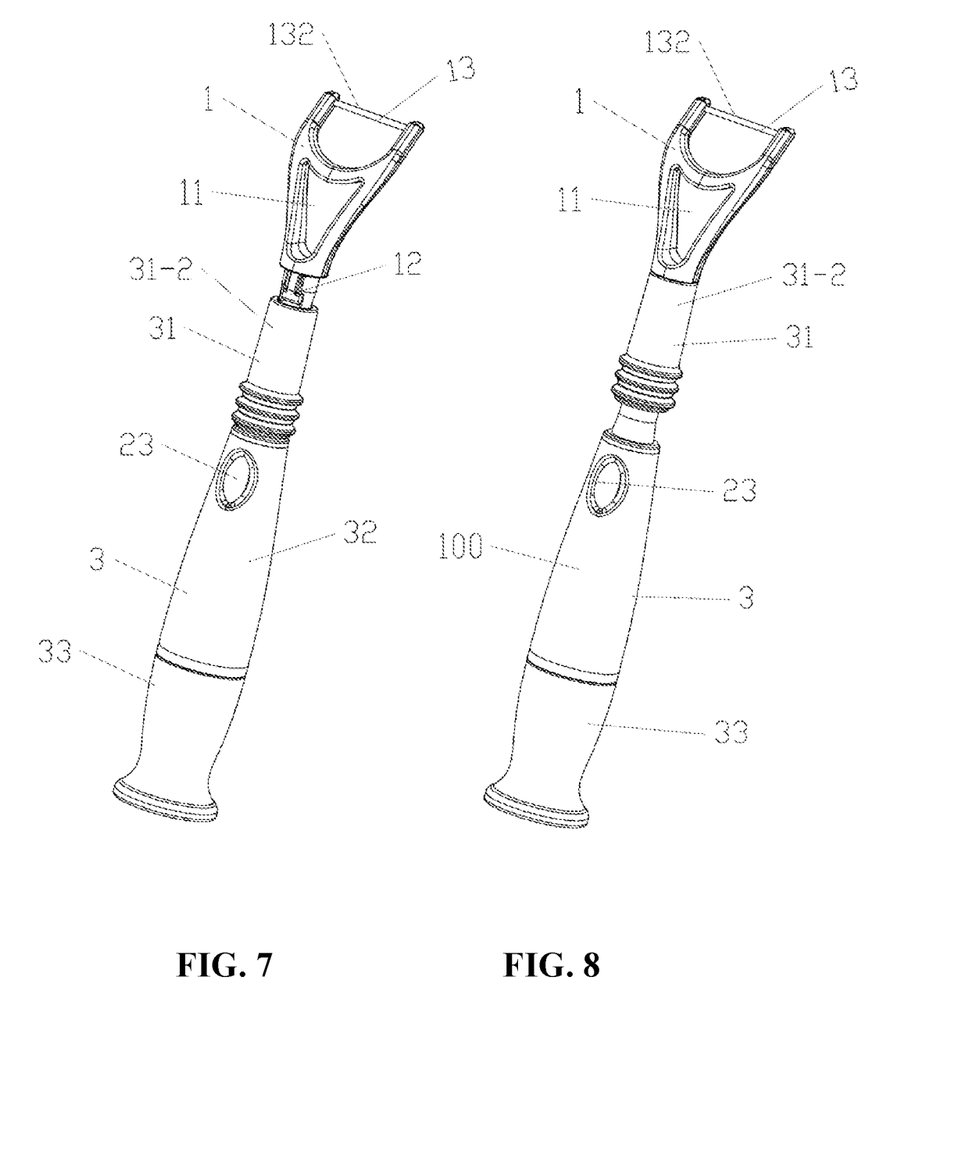
FIG. 7 is a schematic structural diagram of luminous dental floss in an unlocked state according to the present application. In the present embodiment, the dental floss 1 is flat dental floss 132.
FIG. 8 is a schematic structural diagram of luminous dental floss in a locked state according to the present application. In the present embodiment, the dental floss 1 is flat dental floss 132.

In addition, the dental floss 1 may further be flat dental floss 132. The flat dental floss 132 has a thinner thickness and can enter a thinner gap between teeth, which is especially suitable for young people, as shown in FIG. 7 and FIG. 8.

Figure 9:
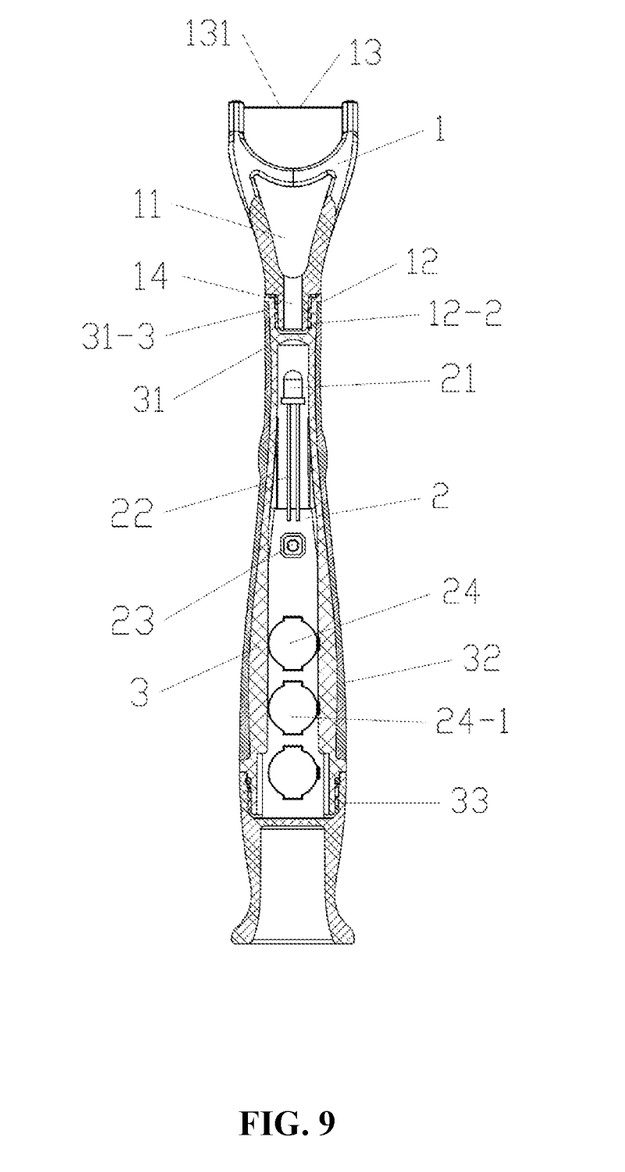
FIG. 9 is a schematic structural diagram of luminous dental floss rotatably connected according to the present application. In the present embodiment, the dental floss 1 and the front end of the handle 3 are connected by using threads, and assembly and disassembly between the dental floss 1 and the handle 3 can be achieved by rotating in different directions.

Embodiment 2: Luminous Dental Floss Connected Through Threads of the Present Application Referring to the figure, a difference between the present embodiment and Embodiment 1 is that in the present embodiment, the dental floss 1 is connected to the handle 3 through threaded connection.

A connecting screw 12-2 is disposed on a connecting portion 12 of the dental floss 1, and a connecting nut 31-3 is disposed on the connecting end 31 of the handle 3. The dental floss 1 is rotated to achieve the connection between the dental floss 1 and the handle 3.

In the present embodiment, a light guide channel 14 is disposed on the dental floss 1. The illumination light emitted by the light source system 21 is transmitted into the oral cavity through the light guide channel 14 to illuminate the oral cavity.

During use, the connecting screw 12-2 of the dental floss 1 is screwed into the connecting nut 31-3, and the dental floss 1 is connected to the handle 3. By pressing the switch 23, the light source system 21 emits illumination light, the illumination light being transmitted into the oral cavity through the light guide channel 25, and the dental floss 1 can be used to clean the oral cavity conveniently while illuminating the oral cavity.

The threaded connection manner of the present embodiment leads to a more simple and convenient connection process. The illumination light provided by the illumination system 2 illuminates the oral cavity, so that the cleaned part may be clearly observed in the cleaning process, thereby effectively preventing accidental damage to gums while ensuring the cleaning effect.

It should be noted that the structure disclosed and described in this specification may be replaced with another structure with the same effect. In addition, the embodiments described in the present application are not the only structure of implementing the present application. Although exemplary embodiments of the present application have been introduced and described in this specification, it should be understood by a person skilled in the art that the embodiments are merely described by way of example, and a person skilled in the art may make various changes, improvements, and replacements without departing from the present application. Therefore, the protection scope of the present appli-

The invention claimed is:

1. A luminous dental floss tool, comprising: a detachable dental floss component, an illumination system, and a handle, wherein the dental floss component includes:
   a connecting portion connecting the detachable dental floss component and the handle;
   a working portion comprising a dental flossing thread, the working portion having a first opening and configured such that the dental flossing thread can enter between the teeth of a user; and
   an observation window provided between the working portion and the connecting portion, the observation window including a second opening distinct from the first opening, the second opening facilitating observation of the teeth of the user during cleaning;
   the illumination system includes a light source system, a circuit system, a switch, and a power supply system, the light source system being connected to the power supply system through the circuit system;
   the handle includes a connecting end configured to connect connected to the detachable dental floss component; and
   the dental floss component is detachably connected to the handle, the circuit system and the power supply system are mounted in the handle; and the switch is mounted on the handle.

2. The luminous dental floss tool according to claim 1, wherein the dental floss component is made of a light guide material.

3. The luminous dental floss tool according to claim 1, wherein a light guide channel is disposed on the detachable dental floss component.

4. The luminous dental floss tool according to claim 1, wherein the detachable dental floss component and the handle are connected in a rotating manner, a concave-convex snap fit manner, or an interference fit manner.

5. The luminous dental floss tool according to claim 4, wherein the detachable dental floss component and the handle are connected in a concave-convex snap fit manner, the connecting portion comprises a positioning convex step, and the connecting end comprises a positioning groove, the positioning convex step being embedded in the positioning groove during connection.

6. The luminous dental floss tool according to claim 5, wherein the connecting end further comprises a fixing sleeve, the fixing sleeve being pushed upward during connection and being capable of fixing the positioning convex step and the positioning groove.

7. The luminous dental floss tool according to claim 1, wherein the light source system is mounted in the handle, and a front end of the handle is made of a light guide material.

8. The luminous dental floss tool according to claim 1, wherein the power supply system is a battery, the battery being mounted in the handle.

9. The luminous dental floss tool according to claim 8, wherein the handle is provided with an end cover, the battery disposed in the handle being replaced after the end cover is removed.

10. The luminous dental floss tool according to claim 1, wherein the illumination system has a timing function, and the light source system is automatically turned off within a specified time after the switch is turned on.

11. The luminous dental floss tool according to claim 1, wherein the luminous dental floss is capable of being placed on a tabletop in an upright manner.

\* \* \* \* \*